(12) United States Patent
Colson et al.

(10) Patent No.: US 10,774,843 B2
(45) Date of Patent: Sep. 15, 2020

(54) FAN HOUSING FOR RAM AIR FAN

(71) Applicant: Hamilton Sundstrand Corporation, Charlotte, NC (US)

(72) Inventors: Darryl A. Colson, West Suffield, CT (US); Murtuza Lokhandwalla, South Windsor, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 28 days.

(21) Appl. No.: 15/923,758

(22) Filed: Mar. 16, 2018

(65) Prior Publication Data
US 2019/0285087 A1 Sep. 19, 2019

(51) Int. Cl.
| F04D 19/00 | (2006.01) |
| F04D 29/52 | (2006.01) |
| B64D 13/06 | (2006.01) |
| F04D 29/64 | (2006.01) |
(Continued)

(52) U.S. Cl.
CPC ........... *F04D 29/522* (2013.01); *B64D 13/06* (2013.01); *B64D 13/08* (2013.01); *F04D 19/00* (2013.01); *F04D 25/0606* (2013.01); *F04D 29/644* (2013.01); *F04D 29/646* (2013.01); *B64D 2013/0618* (2013.01); *F04D 25/06* (2013.01); *F05D 2260/37* (2013.01)

(58) Field of Classification Search
CPC .... F04D 29/522; F04D 29/526; F04D 29/646; B64D 13/06
See application file for complete search history.

(56) References Cited

U.S. PATENT DOCUMENTS

| 6,460,353 B2 | 10/2002 | Udobot et al. |
| 6,728,480 B1 | 4/2004 | Maeda et al. |
| 7,342,332 B2 | 3/2008 | McAuliffe et al. |
(Continued)

FOREIGN PATENT DOCUMENTS

| CN | 102562819 A | 7/2012 |
| CN | 103062129 A | 4/2013 |
(Continued)

OTHER PUBLICATIONS

Extended European Search Report for European Patent Application No. 19156965.6, dated Jun. 25, 2019, 12 pages.
(Continued)

*Primary Examiner* — Kenneth J Hansen
*Assistant Examiner* — Behnoush Haghighian
(74) *Attorney, Agent, or Firm* — Kinney & Lange, P.A.

(57) ABSTRACT

A fan housing includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The outer housing portion includes a first thickened wall section with a first end and a second end, a stator interface section with a first end connected to the second end of the first thickened wall section and a second end, and a second thickened wall section with a first end connected to the second end of the stator interface section and a second end.

17 Claims, 6 Drawing Sheets

(51) Int. Cl.
*B64D 13/08* (2006.01)
*F04D 25/06* (2006.01)

(56) References Cited

U.S. PATENT DOCUMENTS

| | | | |
|---|---|---|---|
| 7,394,175 B2 | 7/2008 | McAuliffe et al. | |
| 8,425,660 B2 | 4/2013 | Ike et al. | |
| 8,459,966 B2 | 6/2013 | Hipsky et al. | |
| 8,882,454 B2* | 11/2014 | Chrabascz | F04D 29/046 |
| | | | 244/53 B |
| 8,887,486 B2* | 11/2014 | Rosen | B64D 13/06 |
| | | | 60/226.1 |
| 9,909,594 B2 | 3/2018 | Chrabascz et al. | |
| 10,132,327 B2* | 11/2018 | Beers | B64D 13/02 |
| 10,155,290 B2* | 12/2018 | Beers | F04D 29/056 |
| 2006/0059941 A1* | 3/2006 | Merritt | B64D 13/06 |
| | | | 62/401 |
| 2013/0071237 A1 | 3/2013 | Beers et al. | |
| 2013/0097997 A1* | 4/2013 | Chrabascz | F04D 29/541 |
| | | | 60/226.1 |
| 2013/0098045 A1 | 4/2013 | Binek et al. | |
| 2013/0101400 A1* | 4/2013 | Binek | F04D 29/522 |
| | | | 415/175 |
| 2013/0101402 A1* | 4/2013 | Rosen | F04D 19/00 |
| | | | 415/180 |
| 2013/0180220 A1 | 7/2013 | McAuliffe et al. | |
| 2013/0243619 A1* | 9/2013 | Beers | F04D 25/08 |
| | | | 417/321 |
| 2014/0056718 A1 | 2/2014 | Beers et al. | |
| 2014/0119908 A1* | 5/2014 | Chrabascz | F04D 19/00 |
| | | | 415/208.1 |
| 2015/0037138 A1* | 2/2015 | Beers | F04D 19/00 |
| | | | 415/107 |
| 2015/0104302 A1 | 4/2015 | Colson et al. | |
| 2016/0186780 A1* | 6/2016 | Chrabascz | F04D 29/542 |
| | | | 415/169.2 |
| 2018/0066666 A1* | 3/2018 | Colson | F04D 29/0513 |

FOREIGN PATENT DOCUMENTS

| | | |
|---|---|---|
| CN | 103591052 A | 2/2014 |
| CN | 103790865 A | 5/2014 |
| CN | 104121233 A | 10/2014 |
| EP | 3290714 A1 | 7/2018 |

OTHER PUBLICATIONS

Office Action for Chinese Patent Application No. 201510696182.5, dated Jul. 23, 2018, 8 pages.
Office Action for Chinese Patent Application No. 201510696182.5, dated Jan. 17, 2019, 5 pages.

* cited by examiner

FAN HOUSING FOR RAM AIR FAN

BACKGROUND

The present invention relates to an environmental control system. In particular, the invention relates to a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan. As with any system aboard an aircraft, there is great value in an improved ram air fan that includes innovative components designed to improve the operational efficiency of the ram air fan and to reduce its weight.

SUMMARY

A fan housing for a ram air fan includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The outer housing portion includes a first thickened wall section with a first end and a second end, a stator interface section with a first end connected to the second end of the first thickened wall section and a second end, and a second thickened wall section with a first end connected to the second end of the stator interface section and a second end.

A fan housing for a ram air fan includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The fan housing further includes mounting projections positioned on a radially outer surface of a downstream section of the outer housing portion that are configured to mount the fan housing to a bearing housing.

A ram air fan includes a tie rod with a first end and a second end, a motor including a rotor that rotates with the tie rod and a stator positioned radially around the rotor, and a fan housing positioned adjacent the first end of the tie rod. The fan housing includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The outer housing portion includes a first thickened wall section with a first end and a second end, a stator interface section with a first end connected to the second end of the first thickened wall section and a second end, and a second thickened wall section with a first end connected to the second end of the stator interface section and a second end.

A ram air fan includes a tie rod with a first end and a second end, a motor including a rotor that rotates with the tie rod and a stator positioned radially around the rotor, a bearing housing adjacent the second end of the tie rod, and a fan housing positioned adjacent the first end of the tie rod. The fan housing includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The fan housing further includes mounting projections positioned on a radially outer surface of a downstream section of the outer housing portion that are configured to mount the fan housing to a bearing housing.

DETAILED DESCRIPTION

Figure 1:
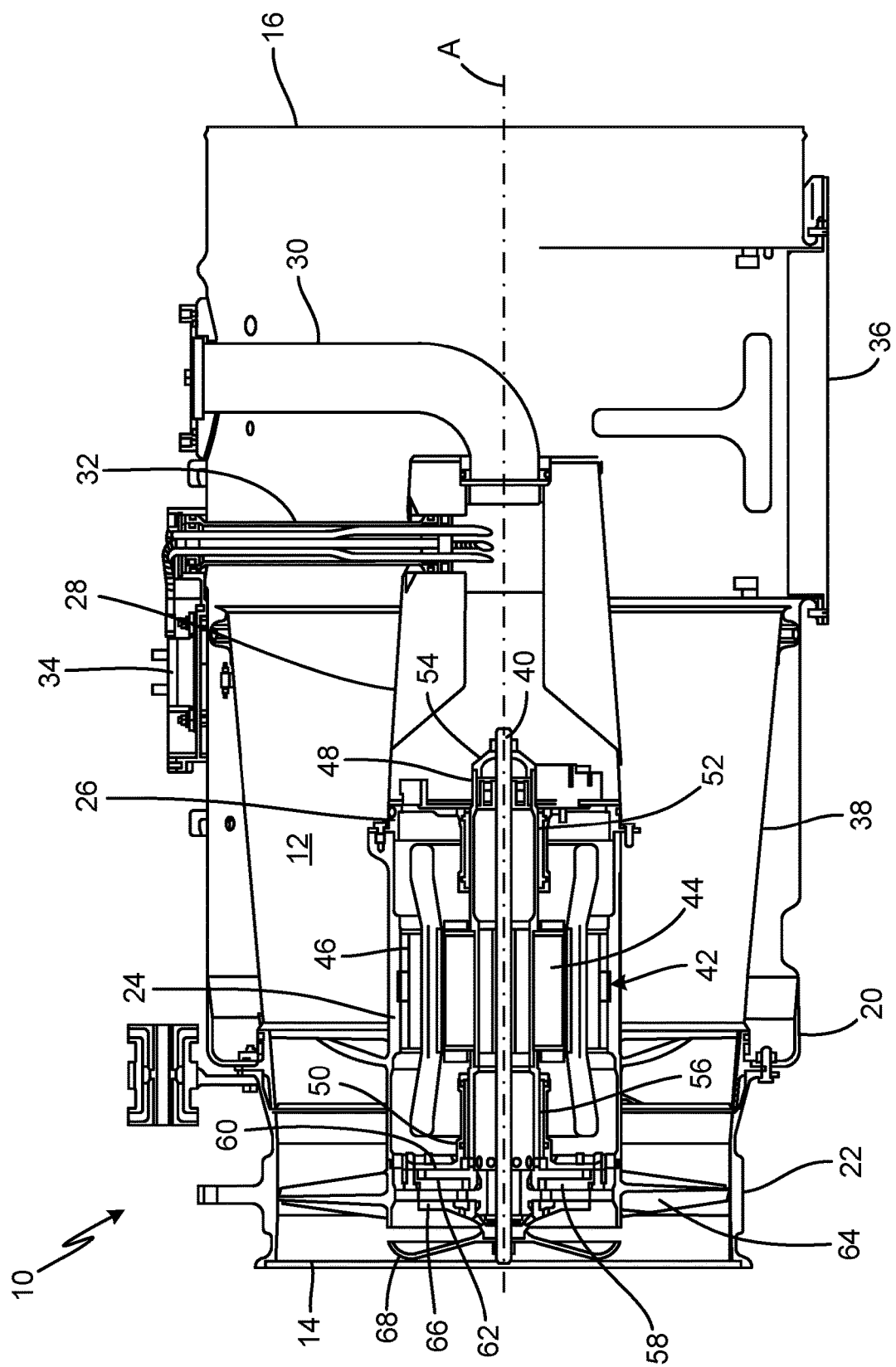
FIG. 1 is a cross-sectional view of a ram air fan.

FIG. 1 is a cross-sectional view of ram air fan 10, which includes ram air flow path 12, ram air inlet 14, and ram air outlet 16. Ram air fan 10 further includes outer housing 20, inlet housing 22, fan housing 24, bearing housing 26, inner housing 28, motor bearing cooling tube 30, wire transfer tube 32, terminal box 34, check valve 36, diffuser 38, tie rod 40, motor 42, motor rotor 44, motor stator 46, journal bearing shaft 48, thrust shaft 50, first journal bearing 52, shaft cap 54, second journal bearing 56, thrust plate 58, first thrust bearing 60, second thrust bearing 62, fan rotor 64, hub 66, and inlet shroud 68. Axis A extends along a central axis ram air fan 10.

Ram air fan 10 includes ram air flow path 12 that extends between ram air inlet 14 and ram air outlet 16. Outer housing 20 and inlet housing 22 are attached form a housing of ram air fan 10. Ram air inlet 14 is positioned at an upstream end of inlet housing 22, and ram air outlet 16 is positioned at a downstream end of outer housing 20. Fan housing 24, bearing housing 26, and inner housing 28 are held within outer housing 20 and inlet housing 22. Fan housing 24 has fan struts that are bolted between outer housing 20 and inlet housing 22 to attach fan housing 24 to outer housing 20 and inlet housing 22. An upstream end of bearing housing 26 is bolted to a downstream end of fan housing 24. An upstream end of inner housing 28 is attached to a downstream end of bearing housing 26.

Motor bearing cooling tube 30 is connected to and extends between inner housing 28 and outer housing 20. Motor bearing cooling tube 30 provides a source of cooling air to ram air fan 10. Wire transfer tube 32 is connected to and extends between inner housing 28 and outer housing 20. Terminal box 34 is positioned on an outer surface of outer housing 20. Wire transfer tube 32 is connected to terminal box 34. Check valve 36 is positioned in outer housing 20. Diffuser 38 is attached to an inner surface of outer housing 18.

Tie rod 40 extends through fan housing 24, bearing housing 26, and inner housing 28. Tie rod 40 is centered on axis A. Motor 42 is positioned around tie rod 40. Motor 42 includes motor rotor 44 and motor stator 46 positioned radially outwards from motor rotor 44. Motor rotor 44 rotates with tie rod 40. Motor stator 46 is a static component that is attached to fan housing 24.

Journal bearing shaft 48 is attached to a downstream end of motor rotor 44. Thrust shaft 50 is attached to an upstream end of motor rotor 44. Journal bearing shaft 48, motor rotor 44, and thrust shaft 50 define an axis of rotation for ram air fan 10. First journal bearing 52 is positioned on a downstream end of motor 42 between journal bearing shaft 48 and bearing housing 26. Shaft cap 54 is positioned on a downstream end of journal bearing shaft 48. Shaft cap 54 is secured to journal bearing shaft 48 with nuts.

Second journal bearing 56 is positioned on an upstream end of motor 42 between thrust shaft 50 and fan housing 24. Thrust plate 58 is a static component that is bolted to fan housing 24. Thrust plate 58 is positioned on an upstream end of a flange portion of thrust shaft 50. First thrust bearing 60 is positioned between the flange portion of thrust shaft 50 and fan housing 24. Second thrust bearing 62 is positioned between flange portion of thrust shaft 50 and thrust plate 58. Fan rotor 64 is positioned around tie rod 40 on an upstream end of thrust plate 58. Hub 66 is positioned on an upstream end of fan rotor 64, and inlet shroud 68 is positioned on an upstream end of hub 66. Hub 66 and inlet shroud 68 are secured to fan rotor 64 with nuts. Fan rotor 64, hub 66, inlet shroud 68, and a portion of fan housing 24 are contained within inlet housing 22.

In operation, ram air fan 10 is installed into an environmental control system (ECS) aboard an aircraft. When the aircraft does not move fast enough to generate sufficient ram air pressure to meet the cooling needs of the ECS, power is supplied to motor 42 by wires running from terminal box 34, through wire transfer tube 32, inner housing 28, and bearing housing 26. The power energizes motor stator 44, which causes rotor 42 to rotate about axis A of ram air fan 10. This in turn rotates journal bearing shaft 48 and thrust shaft 50, which are connected to motor rotor 44. Fan rotor 64, hub 66, and inlet shroud 68 also rotate by way of their connection to thrust shaft 50. First journal bearing 52, second journal bearing 56, first thrust bearing 60, and second thrust bearing 62 provide low friction support for the rotating components. As fan rotor 64 rotates, it moves air from ram air inlet 14 into ram air flow path 12, which includes moving the air through inlet housing 22, past the fan struts of fan housing 24, and into the space between fan housing 24 and outer housing 20. This increases the air pressure in outer housing 20. As the air moves through ram air flow path 12, it flows across diffuser 38 and inner housing 28, where the static pressure increases due to the shape of diffuser 38 and the shape of inner housing 28. Once the air flows across inner housing 28, it moves out of outer housing 20 at ram air outlet 16.

Components within bearing housing 26 and fan housing 24, especially motor 42, first journal bearing 52, second journal bearing 56, first thrust bearing 60, and second thrust bearing 62, generate significant heat and must be cooled. Cooling air is provided by motor bearing cooling tube 30 which directs a flow of cooling air to inner housing 28. Inner housing 28 directs the flow of cooling air to bearing housing 26, where it flows past components in bearing housing 26 and fan housing 24 to cool motor 42, first journal bearing 52, second journal bearing 56, first thrust bearing 60, and second thrust bearing 62. The cooling air then exits fan housing 24 through cooling holes in fan rotor 64 and hub 66. The cooling air is directed upwards into ram air flow path 12 between hub 66 and inlet shroud 68.

Figure 2A:
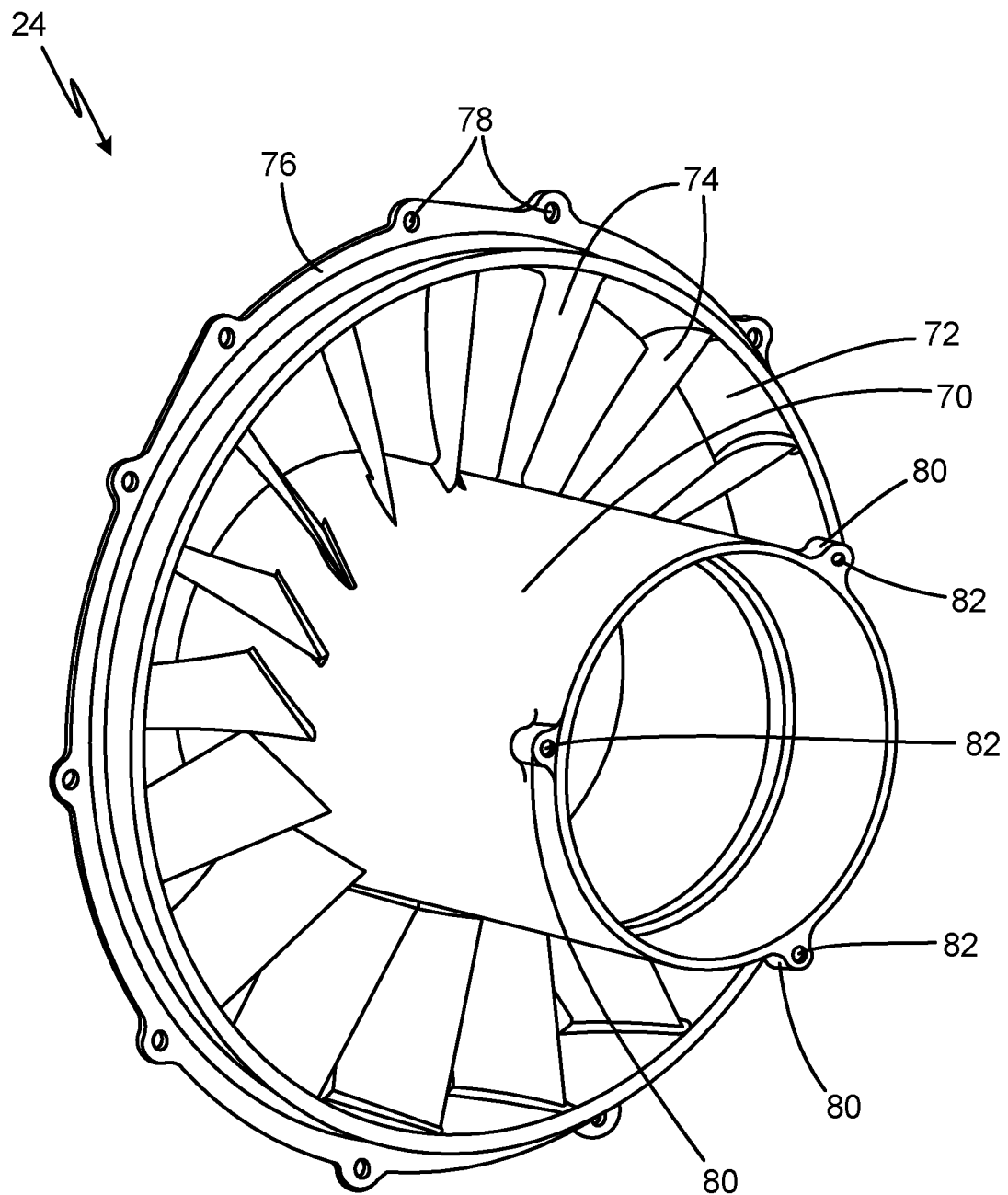
FIG. 2A is a perspective view of a fan housing.
Figure 2B:
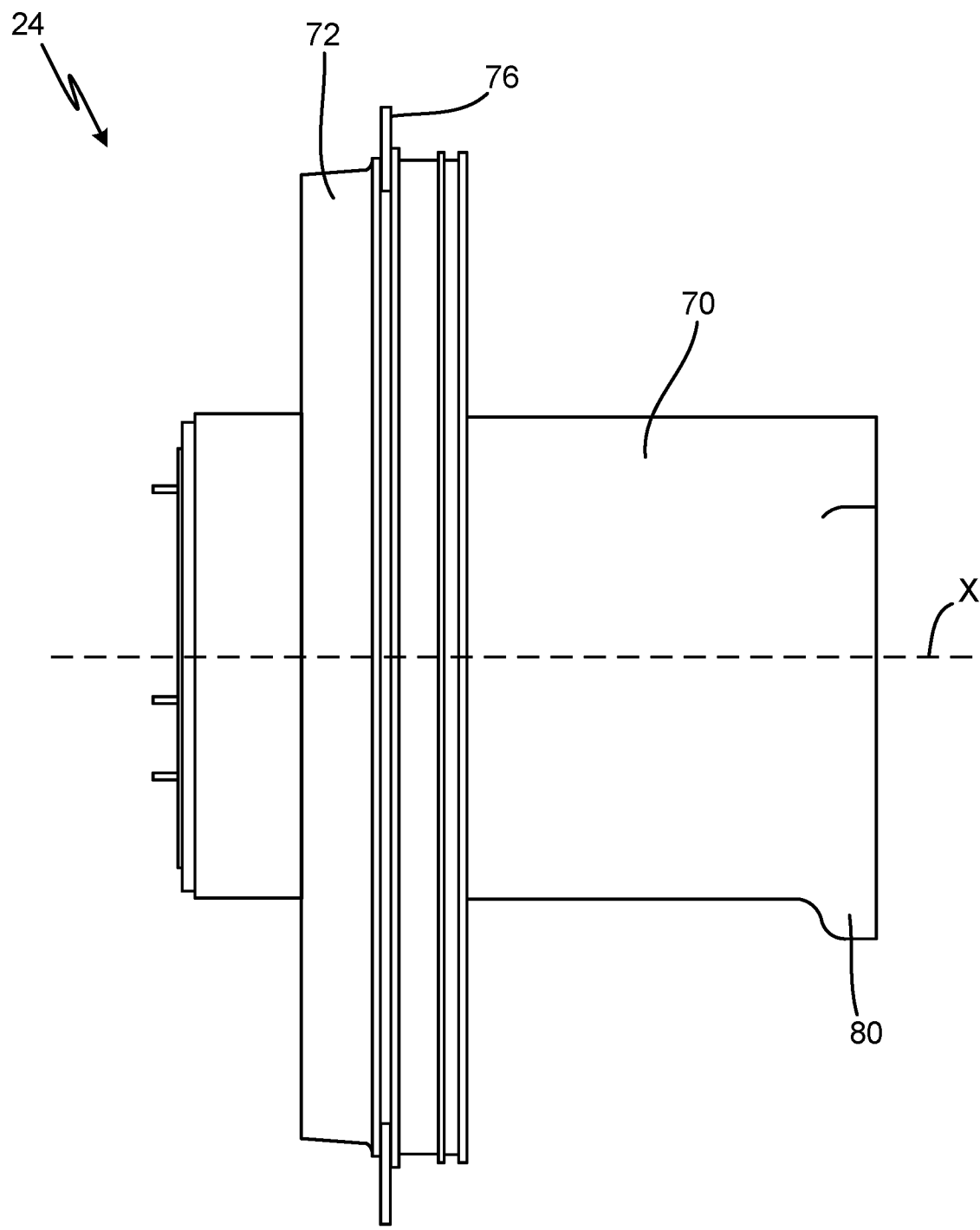
FIG. 2B is a side plan view of the fan housing.

FIG. 2A is a perspective view of fan housing 24. FIG. 2B is a side plan view of fan housing 24. Fan housing 24 includes outer housing portion 70, ring portion 72, fan struts 74 (shown in FIG. 2A), mounting flange 76, bolt holes 78 (shown in FIG. 2A), mounting projections 80, and bolt holes 82 (shown in FIG. 2A). FIG. 2B shows axis X.

Fan housing 24 is made out of aluminum. Fan housing 24 has central axis X extending axially through fan housing 24. Fan housing 24 includes outer housing portion 70 that forms a center body portion of fan housing 24. Outer housing portion 70 is centered on axis X. Ring portion 72 is positioned around outer housing portion 70. Fan struts 74 extend between and connect outer housing portion 70 to ring portion 72. Fan struts 74 extend through ram air flow path 12 of ram air fan 10 (shown in FIG. 1).

Mounting flange 76 extends radially outward from ring portion 72. Bolts holes 78 extend through mounting flange 76. An axially upstream face of mounting flange 76 abuts inlet housing 22 (shown in FIG. 1), and an axially downstream face of mounting flange 76 abuts outer housing 20 (shown in FIG. 1). Bolts extend through bolt holes 78 and are used to connect inlet housing 22 and outer hosing 20 to mounting flange 76 of fan housing 24.

Mounting projections 80 are on a radially outer surface of outer housing portion 70. There are three mounting projections 80 on outer housing portion 70 in the embodiment shown in FIGS. 2A-2B. One bolt hole 82 extends through each mounting projection 80. Mounting projections 80 and bolt holes 82 are used to connect fan housing 24 to bearing housing 26 (shown in FIG. 1).

Fan housing 24 is a structural housing piece for ram air fan 10 (shown in FIG. 1). Fan housing 24 connects outer housing 20 and inlet housing 22 (exterior housings of ram air fan 10) to bearing housing 24 and inner housing 26 (interior housings of ram air fan 10) (shown in FIG. 1). Fan housing 24 houses motor 42, which is positioned on tie rod 40 (shown in FIG. 1).

Figure 3A:
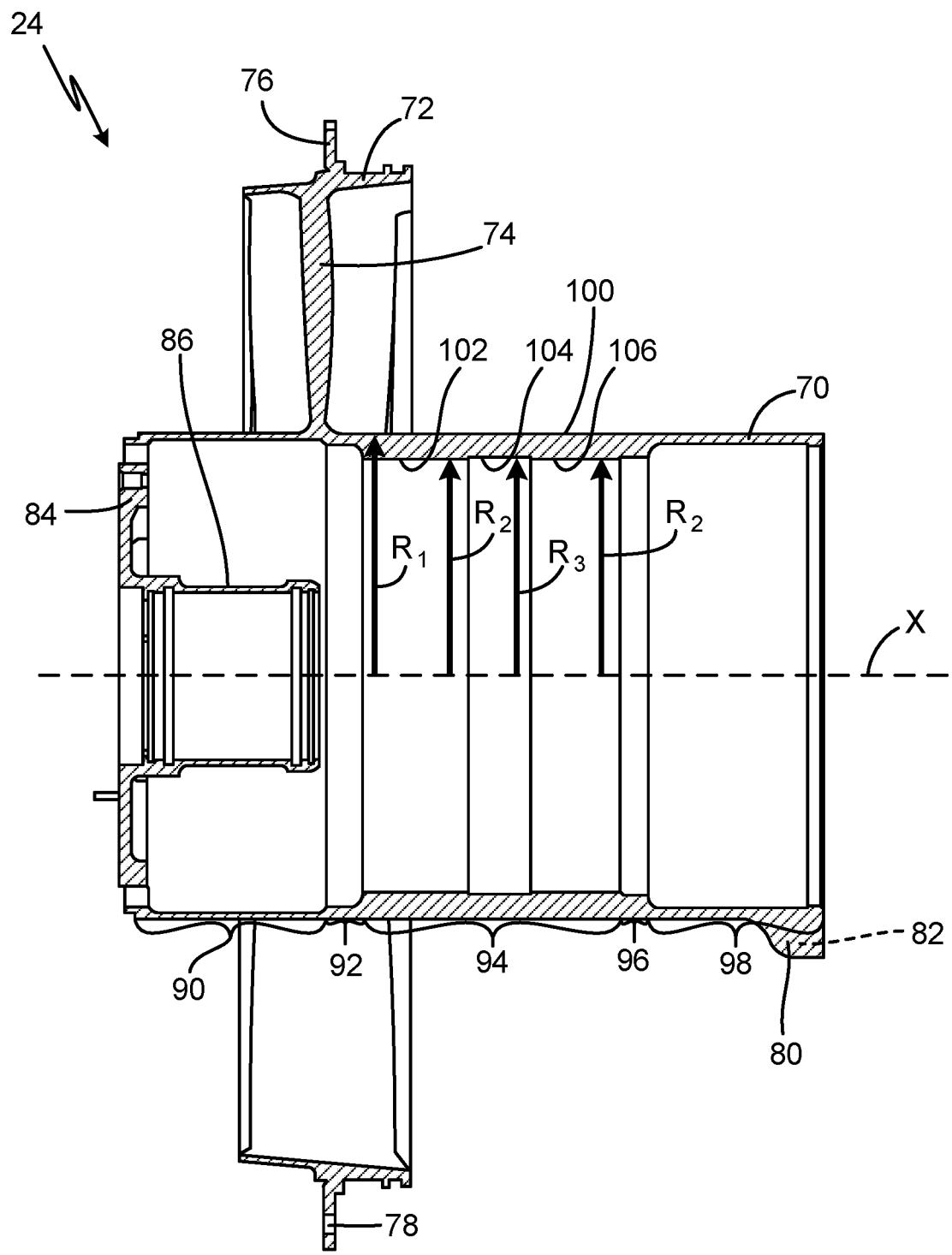
FIG. 3A is a cross-sectional view of the fan housing.
Figure 3B:
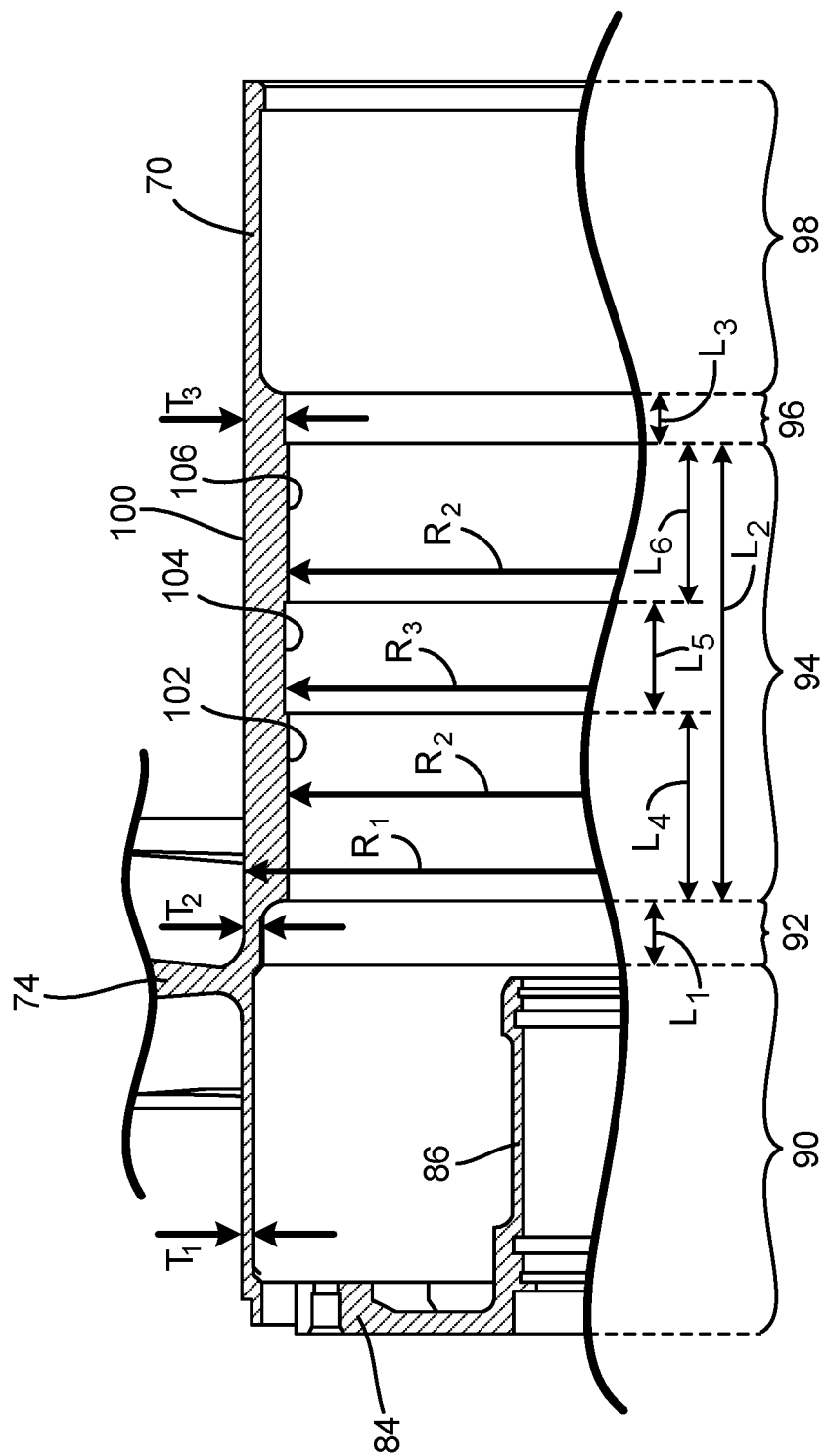
FIG. 3B is an enlarged cross-sectional view of an outer housing portion of the fan housing.

FIG. 3A is a cross-sectional view of fan housing 24. FIG. 3B is an enlarged cross-sectional view of outer housing portion 70 of fan housing 24. Fan housing 24 includes outer housing portion 70, ring portion 72 (shown in FIG. 3A), fan struts 74, mounting flange 76 (shown in FIG. 3A), bolt holes 78 (shown in FIG. 3A), mounting projections 80 (shown in FIG. 3A), bolt holes 82 (shown in FIG. 3A), disk portion 84, and inner housing portion 86. Outer housing portion 70 has upstream section 90, first thickened wall section 92, stator interface section 94, second thickened wall section 96, downstream section 98, radially outer surface 100, first radially inner surface 102, second radially inner surface 104, and third radially inner surface 106. FIG. 3A shows axis X. FIGS. 3A-3B show first radius R1, second radius R2, and third radius R3. FIG. 3B shows first thickness T1, second thickness T2, third thickness T3, first length L1, second length L2, third length L3, fourth length L4, and fifth length L5.

Fan housing 24 has central axis X extending axially through fan housing 24. Fan housing 24 includes outer housing portion 70 that forms a center body portion of fan housing 24. Outer housing portion 70 is centered on and extends along axis X. Ring portion 72 is positioned around outer housing portion 70, and fan struts 74 extend between and connect outer housing portion 70 to ring portion 72. Mounting flange 76 extends radially outward from ring portion 72, and bolts holes 78 extend through mounting flange 76. Mounting projections 80 are on a radially outer surface of outer housing portion 70. One bolt hole 82 extends through each mounting projection 80.

Disk portion 84 extends between and connects a first end of outer housing portion 70 to a first end of inner housing portion 86. A radially outer surface of disk portion 84 is connected to a radially inner surface of outer housing portion 70, and a radially inner surface of disk portion 84 is connected to a radially outer surface of inner housing portion 86. An axially upstream face of disk portion 84 abuts the flange portion of thrust shaft 50 (shown in FIG. 1). Inner housing portion 86 is centered on and extends along axis X. Inner housing portion 86 is positioned around second journal bearing 56 (shown in FIG. 1).

Outer housing portion 70 has upstream section 90, first thickened wall section 92, stator interface section 94, second thickened wall section 96, and downstream section 98. Upstream section 90 extends from the first end of outer housing portion 70 to first thickened wall section 92. First thickened wall section 92 extends from upstream section 90 to stator interface section 94. Stator interface section 94 extends from first thickened wall section 92 to second thickened wall section 96. Second thickened wall section 96 extends from stator interface section 94 to downstream section 98. Downstream section 98 extends from second thickened wall section 96 to a second end of outer housing portion 70.

First thickened wall section 92 has first length $L_1$ in an axial direction. First length $L_1$ is between 0.330 inches (0.8382 centimeters) and 0.510 inches (1.2954 centimeters). Stator interface section 94 has second length $L_2$ in an axial direction. Second length $L_2$ is between 3.450 inches (8.7630 centimeters) and 3.580 inches (9.0932). Second thickened wall section 94 has third length $L_3$ in an axial direction. Third length $L_3$ is between 0.365 inches (0.9271 centimeters) and 0.425 inches (1.0795 centimeters). Second length $L_2$ is greater than first length $L_1$ and third length $L_3$. A ratio of first length $L_1$ to second length $L_2$ is between 0.0922 and 0.1478. A ratio of first length $L_1$ to third length $L_3$ is between 0.7765 and 1.3973. A ratio of second length $L_2$ to third length $L_3$ is between 8.1176 and 9.8082.

Upstream section 90 of outer housing portion 70 has a wall with first thickness $T_1$. First thickness $T_1$ is between 0.06 inches (0.1524 centimeters) and 0.1 inches (0.254 centimeters). First thickened wall section 92 of outer housing portion 70 has a wall with second thickness $T_2$. Second thickness $T_2$ is between 0.12 inches (0.3048 centimeters) and 0.16 inches (0.4064 centimeters). Second thickened wall section 96 of outer housing portion 70 has a wall with third thickness $T_3$. Third thickness $T_3$ is between 0.253 inches (0.6426 centimeters) and 0.374 inches (0.9500 centimeters). First thickness $T_1$ is smaller than second thickness $T_2$ and third thickness $T_3$. Second thickness $T_2$ is smaller than third thickness $T_3$. A ratio of first thickness $T_1$ to second thickness $T_2$ is between 0.3750 and 0.8333. A ratio of first thickness $T_1$ to third thickness $T_3$ is between 0.1604 and 0.3953. A ratio of second thickness $T_2$ to third thickness $T_3$ is between 0.3209 and 0.6324.

Stator interface section 94 has radially outer surface 100 extending along stator interface section 94. Stator interface section 94 has first radially inner surface 102 extending from a first end of stator interface section 94, second radially inner surface 104 extending from first inner surface 102, and third radially inner surface 106 extending from second radially inner surface 104 to a second end of stator interface section 94.

First radially inner surface 102 has fourth length $L_4$ in an axial direction. Fourth length $L_4$ is between 1.375 inches (3.4952 centimeters) and 1.525 (3.8735 centimeters). Second radially inner surface 104 has fifth length $L_5$ in an axial direction. Fifth length $L_5$ is between 0.800 inches (2.032 centimeters) and 0.920 inches (2.3368 centimeters). Third radially inner surface 106 has sixth length $L_6$ in an axial direction. Sixth length $L_6$ is between 1.155 inches (2.9337 centimeters) and 1.255 inches (3.1877 centimeters). Fourth length $L_4$ is greater than fifth length $L_5$ and sixth length $L_6$. Sixth length $L_6$ is greater than fifth length $L_5$. A ratio of fourth length $L_4$ to fifth length $L_5$ is between 1.4946 and 1.9063. A ratio of fourth length $L_4$ to sixth length $L_6$ is between 1.0956 and 1.3203. A ratio of fifth length $L_5$ to sixth length $L_6$ is between 0.6375 and 0.7965.

Stator interface section 94 has first radius $R_1$ from axis X to radially outer surface 100. First radius $R_1$ is between 3.255 inches (8.2677 centimeters) and 3.345 inches (8.4963 centimeters). Stator interface section 94 has second radius $R_2$ from axis X to first radially inner surface 102 and from axis X to third radially inner surface 106. Second radius $R_2$ is between 2.942 inches (7.4727 centimeters) and 2.943 inches (7.4752 centimeters). Stator interface section 94 has third radius $R_3$ from axis X to second radially inner surface 104. Third radius $R_3$ is between 2.952 inches (7.4981 centimeters) and 2.973 inches (7.5514 centimeters). First radius $R_1$ is larger than second radius $R_2$ and third radius $R_3$. Third radius $R_3$ is larger than second radius $R_2$. A ratio of first radius $R_1$ to second radius $R_2$ is between 1.1060 and 1.1370. A ratio of first radius $R_1$ to third radius $R_3$ is between 1.0949 and 1.1331. A ratio of second radius $R_2$ to third radius $R_3$ is between 0.9896 and 0.9970.

Fan housing 24 has first thickened wall section 92 and second thickened wall section 96 to contain fragments of motor rotor 44 (shown in FIG. 1) in the event of a failure of motor rotor 44. First thickened wall section 92 and second thickened wall section 96 have walls with second thickness $T_2$ and third thickness $T_3$, respectively, that are greater than first thickness $T_1$ of the wall of upstream section 90. Thickening the wall at first thickened wall section 92 and second thickened wall section 96 helps to contain fragments of motor rotor 44 in the event of a failure of motor rotor 44 and prevents fragments of motor rotor 44 from moving through the walls of fan housing 24. Second thickened wall section 96 is designed to be thicker than first thickened wall section 92, as ring portion 72 of fan housing 24 is positioned radially outwards of first thickened housing section 92 and provides further containment. First thickened wall section 92 and second thickened wall section 94 allow fan housing 24 to radially contain any fragments broken off of motor rotor 44.

Stator interface section 94 has first radially inner surface 102 and third radially inner surface 106 that have second radius $R_2$. Second radius $R_2$ is designed to accommodate a larger motor stator 46 (shown in FIG. 1) that has larger cooling pathways. Further, stator interface section 94 has a critical fit with motor stator 46 (shown in FIG. 1). Second radius $R_2$ is sized to be slightly smaller than an outer diameter of motor stator 46. To insert motor stator 46 into fan housing 24, fan housing 24 is heated to expand and motor stator 46 is cooled to contract. Motor stator 46 is then positioned in fan housing 24. As fan housing 24 and motor stator 46 return to room temperature, the outer diameter of motor stator 46 forms an interference with first radially inner surface 102 and third radially inner surface 106 of stator interface section 94 of fan housing 24. The interference between fan housing 24 and motor stator 46 prevents torque action of motor rotor 44 from rotating motor stator 46 and fan housing 24. At the same time, the interference between fan housing 24 and motor stator 46 is designed to not be so tight as to have a detrimental effect on the performance of motor stator 46.

Stator interface section 94 further has second radially inner surface 104. Second radially inner surface 104 has third radius $R_3$ that is sized to be slightly larger than second radius $R_2$ of first radially inner surface 102 and third radially inner surface 106. A released is formed between motor stator 46 and second radially inner surface 104. The release makes motor stator 46 easier to install and imparts less stress on motor stator 46 during operation of ram air fan 10.

Fan housing 24 provides the following benefits. First, stator interface section 94 is designed to accommodate a larger motor stator 46 (shown in FIG. 1) with a larger cooling pathway. Having a larger cooling pathway through motor stator 46 provides better cooling to motor 42 to extend the life of motor 42 (shown in FIG. 1). Further, stator interface section 94 has a critical fit with motor stator 46 to prevent torque action of motor rotor 44 (shown in FIG. 1) from rotating motor stator 46 and fan housing 24 while also not having a detrimental effect on the performance of motor stator 46. Additionally, stator interface section 94 forms a release between motor stator 46 and fan housing 24 to allow for easier installation of motor stator 46 in fan housing 24 and to impart less stress on motor stator 46 during operation of ram air fan 10. Further yet, first thickened wall section 92 and second thickened wall portion 94 will radially contain any fragments of motor rotor 44 in the event of a failure of motor rotor 44.

Figure 4:
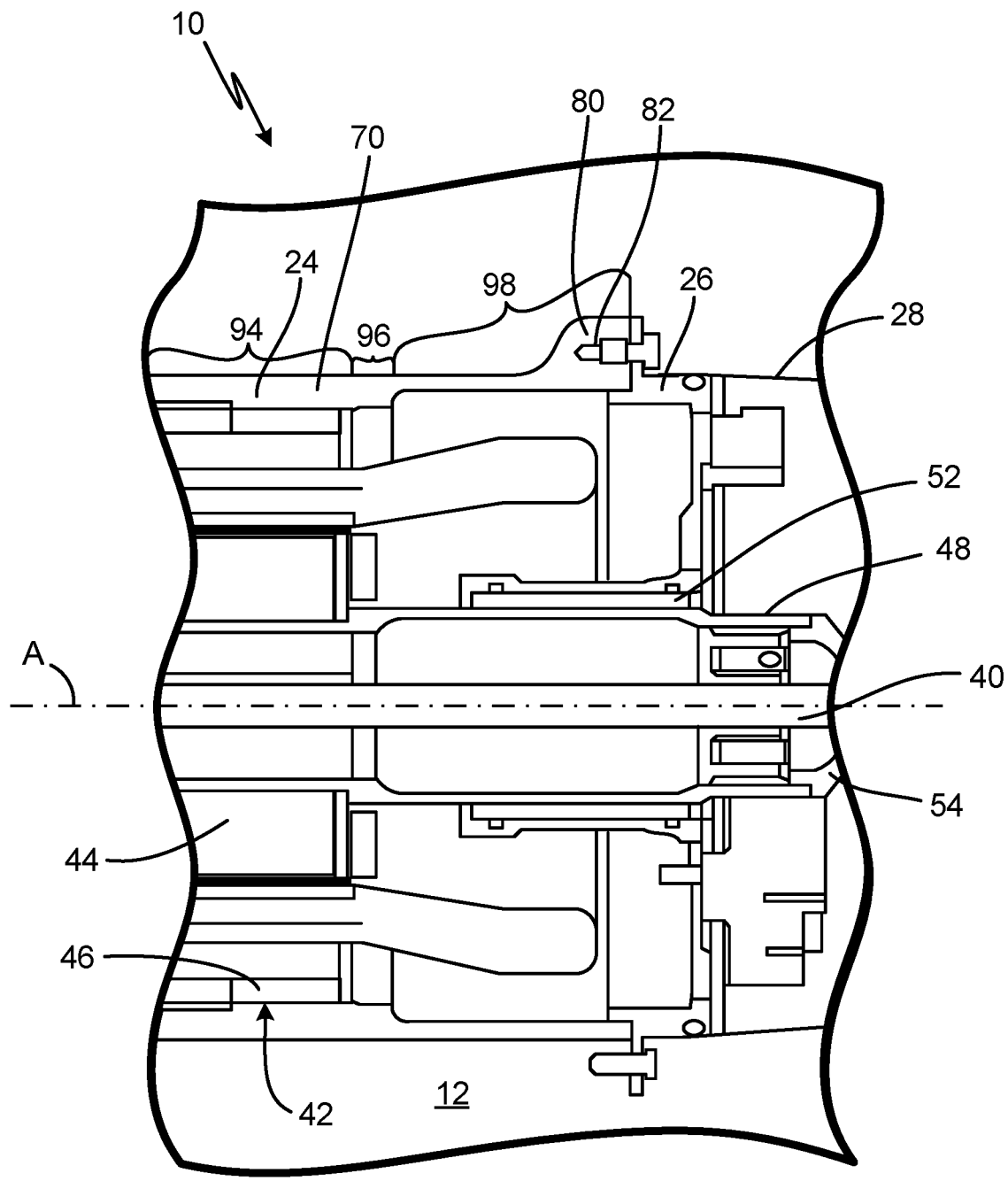
FIG. 4 is an enlarged cross-sectional view of the fan housing bolted to a bearing housing.

FIG. 4 is an enlarged cross-sectional view of fan housing 24 bolted to bearing housing 26. Ram air fan 10 includes ram air flow path 12, fan housing 24, bearing housing 26, inner housing 28, tie rod 40, motor 42, motor rotor 44, motor stator 46, journal bearing shaft 48, first journal bearing 52, and shaft cap 54. Axis A extends along a central axis ram air fan 10. Fan housing 24 includes outer housing portion 70, mounting projections 80, and bolt holes 82. Outer housing portion 70 has stator interface section 94, second thickened wall section 96, and downstream section 98. FIG. 4 also shows axis A.

Ram air fan 10 is described in reference to FIG. 1. Fan housing 24 is described in reference to FIGS. 2A-3B. As shown in FIG. 4, outer housing portion 70 of fan housing 24 has stator interface section 94 that is positioned radially outwards from motor stator 46. Second thickened wall section 96 is positioned downstream from stator interface section 94, and downstream section 98 is positioned downstream from second thickened wall section 96. Downstream section 98 is positioned radially outwards from journal bearing shaft 48, first journal bearing 52, and a part of bearing housing 26.

Mounting projections 80 are positioned on a radially outer surface of downstream section 98 of outer housing portion 70 of fan housing 24. One bolt hole 82 extends through each mounting projection 80. A bolt extends through bearing housing 26 and into each bolt holes 82 in mounting projections 80 to mount bearing housing 26 to fan housing 24.

Discussion of Possible Embodiments

The following are non-exclusive descriptions of possible embodiments of the present invention.

A fan housing for a ram air fan includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The outer housing portion includes a first thickened wall section with a first end and a second end, a stator interface section with a first end connected to the second end of the first thickened wall section and a second end, and a second thickened wall section with a first end connected to the second end of the stator interface section and a second end.

The fan housing of the preceding paragraph can optionally include, additionally and/or alternatively, any one or more of the following features, configurations and/or additional components:

The first thickened wall section has a first length $L_1$ in an axial direction.

The stator interface section has a second length $L_2$ in an axial direction.

The second thickened wall section has a third length $L_3$ in an axial direction.

The second length $L_2$ is greater than the first length $L_1$ and the third length $L_3$.

A ratio of first length $L_1$ to second length $L_2$ is between 0.0922 and 0.1478.

A ratio of first length $L_1$ to third length $L_3$ is between 0.7765 and 1.3973.

A ratio of second length $L_2$ to third length $L_3$ is between 8.1176 and 9.8082.

The first length $L_1$ is between 0.330 inches (0.8382 centimeters) and 0.510 inches (1.2954 centimeters).

The second length $L_2$ is between 3.450 inches (8.7630 centimeters) and 3.580 inches (9.0932).

The third length $L_3$ is between 0.365 inches (0.9271 centimeters) and 0.425 inches (1.0795 centimeters).

The outer housing portion includes an upstream section with a first end aligned with the first end of the outer housing portion and a second end connected to a first end of the first thickened wall portion, and a downstream section with a first end connected to a second end of the second thickened wall portion and a second end aligned with the second end of the outer housing portion.

The upstream section has a wall with a first thickness $T_1$.

The first thickened wall portion has a wall with a second thickness $T_2$.

The second thickened wall portion has a wall with a third thickness $T_3$.

The first thickness $T_1$ is smaller than the second thickness $T_2$ and the third thickness $T_3$.

The second thickness $T_2$ is smaller than the third thickness $T_3$.

A ratio of the first thickness $T_1$ to the second thickness $T_2$ is between 0.3750 and 0.8333.

A ratio of the first thickness $T_1$ to the third thickness $T_3$ is between 0.1604 and 0.3953.

A ratio of the second thickness $T_2$ to the third thickness $T_3$ is between 0.3209 and 0.6324.

The first thickness $T_1$ is between 0.06 inches (0.1524 centimeters) and 0.1 inches (0.254 centimeters).

The second thickness $T_2$ is between 0.12 inches (0.3048 centimeters) and 0.16 inches (0.4064 centimeters).

The third thickness $T_3$ is between 0.253 inches (0.6426 centimeters) and 0.374 inches (0.9500 centimeters).

The stator interface section has a radially outer surface, a first radially inner surface, a second radially inner surface, and a third radially inner surface.

The first radially inner surface has a fourth length $L_4$.

The second radially inner surface has a fifth length $L_5$.

The third radially inner surface has a sixth length $L_6$.

The fourth length $L_4$ is greater than the fifth length $L_5$ and the sixth length $L_6$.

The sixth length $L_6$ is greater than the fifth length $L_5$.

A ratio of the fourth length $L_4$ to the fifth length $L_5$ is between 1.4946 and 1.9063.

A ratio of the fourth length $L_4$ to the sixth length $L_6$ is between 1.0956 and 1.3203.

A ratio of the fifth length $L_5$ to the sixth length $L_6$ is between 0.6375 and 0.7965.

The fourth length $L_4$ is between 1.375 inches (3.4952 centimeters) and 1.525 (3.8735 centimeters).

The fifth length $L_5$ is between 0.800 inches (2.032 centimeters) and 0.920 inches (2.3368 centimeters).

The sixth length $L_6$ is between 1.155 inches (2.9337 centimeters) and 1.255 inches (3.1877 centimeters).

The radially outer surface is positioned a first radius $R_1$ away from the central axis.

The first radially inner surface is positioned a second radius $R_2$ away from the central axis.

The second radially inner surface is positioned a third radius $R_3$ away from the central axis.

The third radially inner surface is positioned the second radius $R_2$ away from the central axis.

The first radius $R_1$ is larger than the second radius $R_2$ and the third radius $R_3$.

The third radius $R_3$ is larger than the second radius $R_2$.

A ratio of the first radius $R_1$ to the second radius $R_2$ is between 1.1060 and 1.1370.

A ratio of the first radius $R_1$ to the third radius $R_3$ is between 1.0949 and 1.1331.

A ratio of the second radius $R_2$ to the third radius $R_3$ is between 0.9896 and 0.9970.

The first radius $R_1$ is between 3.255 inches (8.2677 centimeters) and 3.345 inches (8.4963 centimeters).

The second radius $R_2$ is between 2.942 inches (7.4727 centimeters) and 2.943 inches (7.4752 centimeters).

The third radius $R_3$ is between 2.952 inches (7.4981 centimeters) and 2.973 inches (7.5514 centimeters).

The fan housing further includes mounting projections positioned on a radially outer surface of the outer housing portion that are configured to mount the fan housing to a bearing housing.

The fan housing further includes a ring portion positioned around the outer housing portion, a plurality of fan struts extending between the outer housing portion and the ring portion, and a mounting flange on a radially outer surface of the ring portion.

A fan housing for a ram air fan includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The fan housing further includes mounting projections positioned on a radially outer surface of a downstream section of the outer housing portion that are configured to mount the fan housing to a bearing housing.

The fan housing of the preceding paragraph can optionally include, additionally and/or alternatively, any one or more of the following features, configurations and/or additional components:

The outer housing portion includes an upstream section with a first end aligned with the first end of the outer housing portion, a first thickened wall section with a first end connected to a second end of the upstream section, a stator interface section with a first end connected to a second end of the first thickened wall section, and a second thickened wall section with a first end connected to a second end of the stator interface section.

The downstream section has a first end connected to a second end of the second thickened wall portion and a second end aligned with the second end of the outer housing portion.

The fan housing has three mounting projections on the downstream section of the outer housing portion.

A bolt hole extends into each of the mounting projections.

The fan housing further includes a ring portion positioned around the outer housing portion, a plurality of fan struts extending between the outer housing portion and the ring portion, and a mounting flange on a radially outer surface of the ring portion.

A ram air fan includes a tie rod with a first end and a second end, a motor including a rotor that rotates with the tie rod and a stator positioned radially around the rotor, and a fan housing positioned adjacent the first end of the tie rod. The fan housing includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The outer housing portion includes a first thickened wall section with a first end and a second end, a stator interface section with a first end connected to the second end of the first thickened wall section and a second end, and a second thickened wall section with a first end connected to the second end of the stator interface section and a second end.

The ram air fan of the preceding paragraph can optionally include, additionally and/or alternatively, any one or more of the following features, configurations and/or additional components:

The first thickened wall section has a first length $L_1$ in an axial direction.

The stator interface section has a second length $L_2$ in an axial direction.

The second thickened wall section has a third length $L_3$ in an axial direction.

The second length $L_2$ is greater than the first length $L_1$ and the third length $L_3$.

A ratio of first length $L_1$ to second length $L_2$ is between 0.0922 and 0.1478.

A ratio of first length $L_1$ to third length $L_3$ is between 0.7765 and 1.3973.

A ratio of second length $L_2$ to third length $L_3$ is between 8.1176 and 9.8082.

The first length $L_1$ is between 0.330 inches (0.8382 centimeters) and 0.510 inches (1.2954 centimeters).

The second length $L_2$ is between 3.450 inches (8.7630 centimeters) and 3.580 inches (9.0932).

The third length $L_3$ is between 0.365 inches (0.9271 centimeters) and 0.425 inches (1.0795 centimeters).

The outer housing portion further includes an upstream section with a first end aligned with the first end of the outer housing portion and a second end connected to a first end of the first thickened wall portion, and a downstream section with a first end connected to a second end of the second thickened wall portion and a second end aligned with the second end of the outer housing portion.

The upstream section has a wall with a first thickness $T_1$.

The first thickened wall portion has a wall with a second thickness $T_2$.

The second thickened wall portion has a wall with a third thickness $T_3$.

The first thickness $T_1$ is smaller than the second thickness $T_2$ and the third thickness $T_3$.

The second thickness $T_2$ is smaller than the third thickness $T_3$.

A ratio of the first thickness $T_1$ to the second thickness $T_2$ is between 0.3750 and 0.8333.

A ratio of the first thickness $T_1$ to the third thickness $T_3$ is between 0.1604 and 0.3953.

A ratio of the second thickness $T_2$ to the third thickness $T_3$ is between 0.3209 and 0.6324.

The first thickness $T_1$ is between 0.06 inches (0.1524 centimeters) and 0.1 inches (0.254 centimeters).

The second thickness $T_2$ is between 0.12 inches (0.3048 centimeters) and 0.16 inches (0.4064 centimeters).

The third thickness $T_3$ is between 0.253 inches (0.6426 centimeters) and 0.374 inches (0.9500 centimeters).

The stator interface section has a radially outer surface, a first radially inner surface, a second radially inner surface, and a third radially inner surface.

The first radially inner surface has a fourth length $L_4$.

The second radially inner surface has a fifth length $L_5$.

The third radially inner surface has a sixth length $L_6$.

The fourth length $L_4$ is greater than the fifth length $L_5$ and the sixth length $L_6$.

The sixth length $L_6$ is greater than the fifth length $L_5$.

A ratio of the fourth length $L_4$ to the fifth length $L_5$ is between 1.4946 and 1.9063.

A ratio of the fourth length $L_4$ to the sixth length $L_6$ is between 1.0956 and 1.3203.

A ratio of the fifth length $L_5$ to the sixth length $L_6$ is between 0.6375 and 0.7965.

The fourth length $L_4$ is between 1.375 inches (3.4952 centimeters) and 1.525 (3.8735 centimeters).

The fifth length $L_5$ is between 0.800 inches (2.032 centimeters) and 0.920 inches (2.3368 centimeters).

The sixth length $L_6$ is between 1.155 inches (2.9337 centimeters) and 1.255 inches (3.1877 centimeters).

The radially outer surface is positioned a first radius $R_1$ away from the central axis.

The first radially inner surface is positioned a second radius $R_2$ away from the central axis.

The second radially inner surface is positioned a third radius $R_3$ away from the central axis.

The third radially inner surface is positioned the second radius $R_2$ away from the central axis.

The first radius $R_1$ is larger than the second radius $R_2$ and the third radius $R_3$.

The third radius $R_3$ is larger than the second radius $R_2$.

A ratio of the first radius $R_1$ to the second radius $R_2$ is between 1.1060 and 1.1370.

A ratio of the first radius $R_1$ to the third radius $R_3$ is between 1.0949 and 1.1331.

A ratio of the second radius $R_2$ to the third radius $R_3$ is between 0.9896 and 0.9970.

The first radius $R_1$ is between 3.255 inches (8.2677 centimeters) and 3.345 inches (8.4963 centimeters).

The second radius $R_2$ is between 2.942 inches (7.4727 centimeters) and 2.943 inches (7.4752 centimeters).

The third radius $R_3$ is between 2.952 inches (7.4981 centimeters) and 2.973 inches (7.5514 centimeters).

The fan housing further includes mounting projections positioned on a radially outer surface of the outer housing portion that are configured to mount the fan housing to a bearing housing.

The fan housing further includes a ring portion positioned around the outer housing portion, a plurality of fan struts extending between the outer housing portion and the ring portion, and a mounting flange on a radially outer surface of the ring portion.

The ram air fan further includes a journal bearing shaft positioned radially around the second end of the tie rod; a bearing housing adjacent the second end of the tie rod and positioned around part of the journal bearing shaft; a first journal bearing positioned between the journal bearing shaft and the bearing housing; a thrust shaft positioned radially around the first end of the tie rod; a fan rotor attached to a first end of the tie rod that rotates with the tie rod; a second journal bearing positioned between the fan housing and the thrust shaft; a hub positioned radially around the first end of the tie rod; and an inlet shroud positioned radially around the first end of the tie rod.

A ram air fan includes a tie rod with a first end and a second end, a motor including a rotor that rotates with the tie rod and a stator positioned radially around the rotor, a bearing housing adjacent the second end of the tie rod, and a fan housing positioned adjacent the first end of the tie rod. The fan housing includes an inner housing portion centered on a central axis, an outer housing portion centered on a central axis, and a disk portion connecting the first end of the outer housing portion to the first end of the inner housing portion. The inner housing portion has a first end and a second end positioned axially away from the first end. The outer housing portion has a first end and a second end positioned axially away from the first end. The fan housing further includes mounting projections positioned on a radially outer surface of a downstream section of the outer housing portion that are configured to mount the fan housing to a bearing housing.

The ram air fan of the preceding paragraph can optionally include, additionally and/or alternatively, any one or more of the following features, configurations and/or additional components:

The outer housing portion includes an upstream section with a first end aligned with the first end of the outer housing portion, a first thickened wall section with a first end connected to a second end of the upstream section, a stator interface section with a first end connected to a second end of the first thickened wall section, and a second thickened wall section with a first end connected to a second end of the stator interface section.

The downstream section has a first end connected to a second end of the second thickened wall portion and a second end aligned with the second end of the outer housing portion.

The fan housing has three mounting projections on the downstream section of the outer housing portion.

A bolt hole extends into each of the mounting projections.

The fan housing further includes a ring portion positioned around the outer housing portion, a plurality of fan struts extending between the outer housing portion and the ring portion, and a mounting flange on a radially outer surface of the ring portion.

The downstream section is positioned radially outwards from a journal bearing shaft, a first journal bearing, and a part of the bearing housing.

The ram air fan further includes a journal bearing shaft positioned radially around the second end of the tie rod; a first journal bearing positioned between the journal bearing shaft and the bearing housing; a thrust shaft positioned radially around the first end of the tie rod; a fan rotor attached to a first end of the tie rod that rotates with the tie rod; a second journal bearing positioned between the fan housing and the thrust shaft; a hub positioned radially around the first end of the tie rod; and an inlet shroud positioned radially around the first end of the tie rod.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan housing for a ram air fan, the fan housing comprising:
   an inner housing portion centered on a central axis, the inner housing portion having a first end and a second end positioned axially away from the first end;
   an outer housing portion centered on the central axis, the outer housing portion having a first end and a second end positioned axially away from the first end, wherein the outer housing portion comprises:
      a first thickened wall section with a first end and a second end;
      a stator interface section with a first end connected to the second end of the first thickened wall section and a second end, wherein the stator interface section further comprises:
         a radially outer surface positioned a first radius $R_1$ away from the central axis;
         a first radially inner surface positioned a second radius $R_2$ away from the central axis;
         a second radially inner surface positioned a third radius $R_3$ away from the central axis; and
         a third radially inner surface positioned the second radius $R_2$ away from the central axis;
         wherein the first radius $R_1$ is larger than the second radius $R_2$ and the third radius $R_3$; and
         wherein the third radius $R_3$ is larger than the second radius $R_2$; and
      a second thickened wall section with a first end connected to the second end of the stator interface section and a second end; and
   a disk portion connecting the first end of the outer housing portion to the first end of the inner housing portion.

2. The fan housing of claim 1, wherein:
   the first thickened wall section has a first length $L_1$ in an axial direction;
   the stator interface section has a second length $L_2$ in an axial direction; and
   the second thickened wall section has a third length $L_3$ in an axial direction.

3. The fan housing of claim 2, wherein the second length $L_2$ is greater than the first length $L_1$ and the third length $L_3$.

4. The fan housing of claim 2, wherein:
   a ratio of the first length $L_1$ to the second length $L_2$ is between 0.0922 and 0.1478;
   a ratio of the first length $L_1$ to the third length $L_3$ is between 0.7765 and 1.3973; and
   a ratio of the second length $L_2$ to the third length $L_3$ is between 8.1176 and 9.8082.

5. The fan housing of claim 1, wherein the outer housing portion further comprises:
   an upstream section with a first end aligned with the first end of the outer housing portion and a second end connected to the first end of the first thickened wall portion; and
   a downstream section with a first end connected to the second end of the second thickened wall portion and a second end aligned with the second end of the outer housing portion.

6. The fan housing of claim 5, wherein:
   the upstream section has a wall with a first thickness $T_1$;
   the first thickened wall portion has a wall with a second thickness $T_2$; and
   the second thickened wall portion has a wall with a third thickness $T_3$.

7. The fan housing of claim 6, wherein the first thickness $T_1$ is smaller than the second thickness $T_2$ and the third thickness $T_3$, and wherein the second thickness $T_2$ is smaller than the third thickness $T_3$.

8. The fan housing of claim 6, wherein:
   a ratio of the first thickness $T_1$ to the second thickness $T_2$ is between 0.3750 and 0.8333;
   a ratio of the first thickness $T_1$ to the third thickness $T_3$ is between 0.1604 and 0.3953; and
   a ratio of the second thickness $T_2$ to the third thickness $T_3$ is between 0.3209 and 0.6324.

9. The fan housing of claim 1, wherein:
   the first radially inner surface has a fourth length $L_4$;
   the second radially inner surface has a fifth length $L_5$; and
   the third radially inner surface has a sixth length $L_6$.

10. The fan housing of claim 9, wherein the fourth length $L_4$ is greater than the fifth length $L_5$ and the sixth length $L_6$, and wherein the sixth length $L_6$ is greater than the fifth length $L_5$.

11. The fan housing of claim 9, wherein:
   a ratio of the fourth length $L_4$ to the fifth length $L_5$ is between 1.4946 and 1.9063;
   a ratio of the fourth length $L_4$ to the sixth length $L_6$ is between 1.0956 and 1.3203; and
   a ratio of the fifth length $L_5$ to the sixth length $L_6$ is between 0.6375 and 0.7965.

12. The fan housing of claim 1, wherein:
   a ratio of the first radius $R_1$ to the second radius $R_2$ is between 1.1060 and 1.1370;

a ratio of the first radius $R_1$ to the third radius $R_3$ is between 1.0949 and 1.1331; and a ratio of the second radius $R_2$ to the third radius $R_3$ is between 0.9896 and 0.9970.

13. The fan housing of claim 1, and further comprising:

mounting projections positioned on a radially outer surface of the outer housing portion that are configured to mount the fan housing to a bearing housing;

a ring portion positioned around the outer housing portion;

a plurality of fan struts extending between the outer housing portion and the ring portion; and a mounting flange on a radially outer surface of the ring portion.

14. A fan housing for a ram air fan, the fan housing comprising:

an inner housing portion centered on a central axis, the inner housing portion having a first end and a second end positioned axially away from the first end;

an outer housing portion centered on the central axis, the outer housing portion having a first end and a second end positioned axially away from the first end and further comprising:

a stator interface section which further comprises:

a radially outer surface positioned a first radius $R_1$ away from the central axis;

a first radially inner surface positioned a second radius $R_2$ away from the central axis;

a second radially inner surface positioned a third radius $R_3$ away from the central axis; and a third radially inner surface positioned the second radius $R_2$ away from the central axis;

wherein the first radius $R_1$ is larger than the second radius $R_2$ and the third radius $R_3$; and wherein the third radius $R_3$ is larger than the second radius $R_2$;

a disk portion connecting the first end of the outer housing portion to the first end of the inner housing portion; and mounting projections positioned on a radially outer surface of a downstream section of the outer housing portion that are configured to mount the fan housing to a bearing housing.

15. The fan housing of claim 14, wherein the outer housing portion comprises:

an upstream section with a first end aligned with the first end of the outer housing portion;

a first thickened wall section with a first end connected to a second end of the upstream section;

the stator interface section with a first end connected to a second end of the first thickened wall section; and a second thickened wall section with a first end connected to a second end of the stator interface section;

wherein the downstream section has a first end connected to a second end of the second thickened wall portion and a second end aligned with the second end of the outer housing portion.

16. The fan housing of claim 14, wherein the fan housing has three mounting projections on the downstream section of the outer housing portion.

17. The fan housing of claim 14, wherein a bolt hole extends into each of the mounting projections.

* * * * *